April 2, 1968     C. W. MOTT, JR     3,375,647
BLADE CONSTRUCTION FOR A MOWER
Filed Aug. 11, 1965
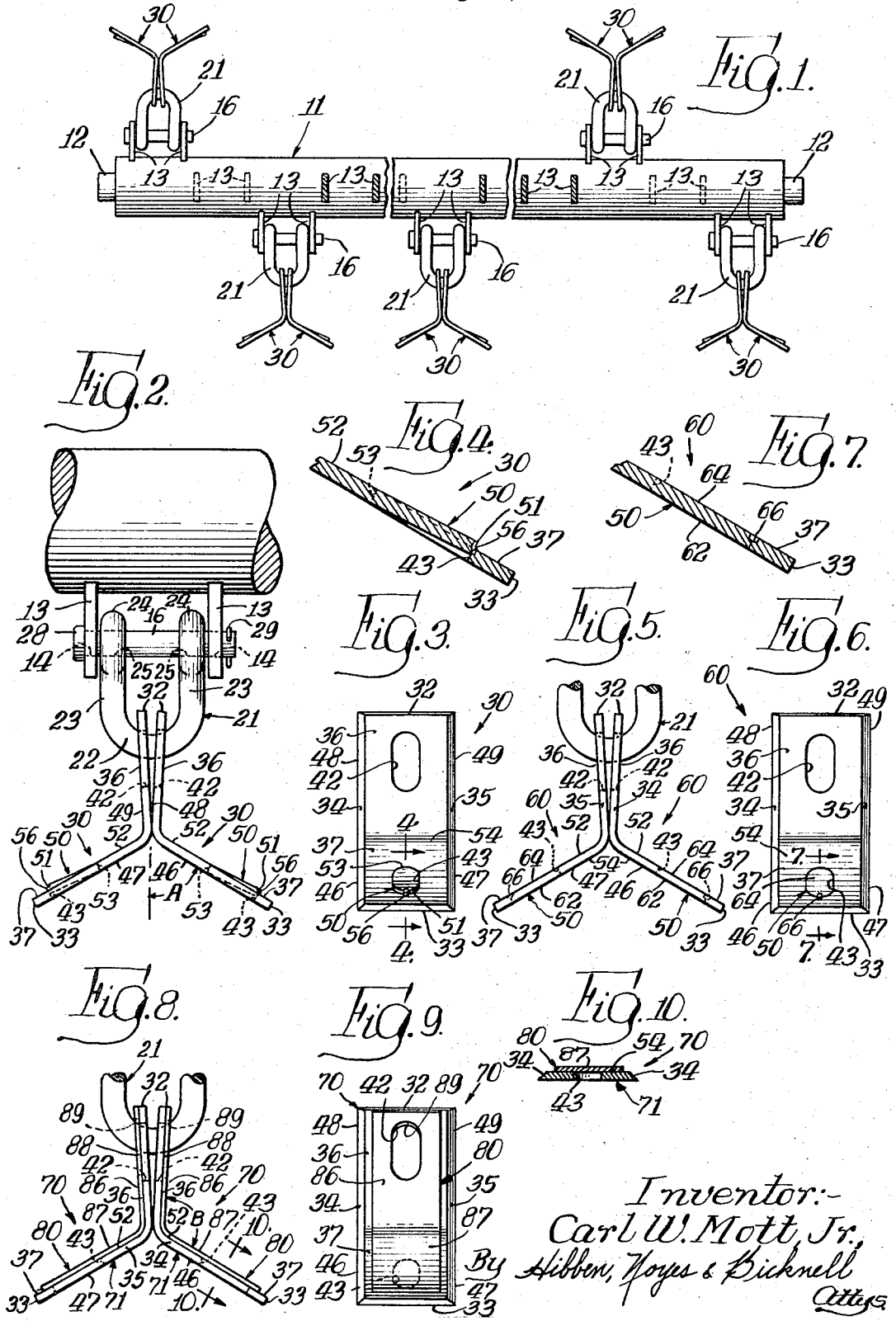

United States Patent Office 3,375,647
Patented Apr. 2, 1968

3,375,647
BLADE CONSTRUCTION FOR A MOWER
Carl W. Mott, Jr., La Grange Park, Ill., assignor to Mott Corporation, La Grange, Ill., a corporation of Illinois
Filed Aug. 11, 1965, Ser. No. 478,850
15 Claims. (Cl. 56—294)

This invention relates to mowers, and more particularly to a novel blade construction for a mower.

In the Carl W. Mott, Jr., Patent No. 3,177,640, issued Apr. 13, 1965, a reversible blade construction for a mower is disclosed and claimed. Such a blade construction is adapted for use with a mower having a horizontal rotatable shaft extending transversely of the direction of travel of the mower and connecting means disposed along the shaft for securing a plurality of the blades or knives to the shaft. The blades are adapted to extend outwardly from the shaft by virtue of centrifugal force upon rotation of the shaft.

The blade construction of the above mentioned patent is of a generally elongated, bent configuration having sharpened longitudinal side edges and end edges with an opening therein adjacent each end edge, such openings being selectively adapted to receive the connecting means for mounting the blades on the shaft. Thus, by shifting the blades side-for-side and/or end-for-end with respect to its mounting, new cutting edges may be rendered operable.

While the foregoing blade construction has proved satisfactory for its intended purpose, under some operating conditions cuttings may tend to accumulate in the unused opening in the blade. Such accumulation is, of course, undesirable in that it tends to cause further accumulation on the cutting edges of the blade so that the cutting efficiency of the blade is impaired.

Accordingly, it is a general object of the present invention to provide an improved blade construction for a mower which reduces the tendency for cuttings to accumulate on the blade.

A more particular object is to provide an improved mower blade construction having spaced openings adjacent its longitudinal ends to permit end-for-end reversal of the blade, and wherein a removable closure is provided for the unused opening to prevent cuttings from accumulating therein when the blade is in use.

Other objects and advantages of the invention will become apparent from the following description and accompanying drawing, in which:

FIG. 1 is a fragmentary front elevational view of a rotatably driven horizontal shaft of a mower, the shaft being provided with a plurality of pairs of blades embodying the features of the present invention;

FIG. 2 is an enlarged front elevational view of a portion of the mower shaft shown in FIG. 1 and an attached pair of blades;

FIG. 3 is a side elevational view of one of the blades shown in FIG. 2;

FIG. 4 is a sectional view taken along the line 4—4 of FIG. 3;

FIG. 5 is a view similar to FIG. 2, but with portions of the blade connecting structure omitted, of another mower blade construction embodying the features of the invention;

FIG. 6 is a side elevational view of one of the blades shown in FIG. 5;

FIG. 7 is a sectional view taken along the line 7—7 of FIG. 5;

FIG. 8 is a view similar to FIG. 5 of another blade construction embodying the features of the present invention;

FIG. 9 is a side elevational view of one of the blades shown in FIG. 8; and

FIG. 10 is a sectional view taken along the line 10—10 of FIG. 8.

In FIG. 1, the horizontal shaft, indicated at 11, of a mower of the type with which the blade constructions of the present invention are adapted to be used, is illustrated. The shaft 11 is usually enclosed in a housing (not shown) having bearing structures for supporting the respective ends, indicated at 12, of the shaft 11. When the mower is in use, the shaft 11 is rotated about its axis, as for example by a pulley and belt arrangement connected to the power take-off of a tractor to which the mower is attached.

Connecting means is provided for detachably connecting a series of pairs of blades to the shaft 11. The connecting means, in the present instance, is shown as comprising a plurality of axially and circumferentially spaced pairs of lugs 13 rigidly secured to the shaft 11, as by welding. An opening 14 (FIG. 2) is provided in each lug 13, near the radial outer end thereof, for receiving a pin extending transversely through the lugs 13. While a single pin could be used for each axially aligned row of lugs, the pin herein shown is a separate pin 16 for each pair of blades.

A bifurcated link 21, preferably in the form of a U-shaped bail or shackle having a semi-circular bight portion 22 and parallel straight arm portions 23, is provided for connecting one or more blades to a pair of the lugs 13. For this purpose, the ends, indicated at 24 in FIG. 2, of the arm portions 23 are provided with openings 25 to receive the pin 16. While the lugs 13 of each pair may be spaced axially a sufficient distance apart to permit the ends 24 of the link 21 to be placed outside of the lugs 13, they are preferably spaced a sufficient distance to receive the ends 24 therebetween. The pin 16 extends through the openings 25 in the ends 24 of a link 21 and the openings 14 in the ends of the lugs 13. One end 28 of the pin 16 may be enlarged to provide a head engageable with the outer side of one of the lugs 13 and the other end of the pin 16 may be provided with a hole for receiving a cotter pin 29 at the outer side of the other lug 13.

As heretofore mentioned, each link 21 is adapted to receive and retain at least one and preferably a pair of cutter blades 30. Each blade 30, in the present instance, comprises an elongated member or strip, preferably of metal, having end edges 32 and 33 and longitudinal side edges 34 and 35. Each blade is preferably bent on a line extending tranversely of its length to provide two reversible mounting and cutting portions, respectively indicated at 36 and 37 in FIG. 3.

When mounted on a link 21, the cutting portions 37 of the two blades are disposed out of the planes of the other portions by an angle such that all different varieties of vegetation that may be cut under varying moisture conditions will be forced off the portion then serving as a cutting portion during operation of the mower. Such angle, indicated at A in FIG. 2, is preferably not substantially greater than about 66° and the bend line between the portions preferably is located substantially midway of the length of the blade so that the portions 36 and 37 are similar in size and shape.

In order to permit engagement of each blade 30 with the link 21 of each connecting means, the blade portions 36 and 37 are provided with openings therethrough in the form of elongated slots 42 and 43 (FIGS. 2 and 3). The slots 42 and 43 are sufficiently large to permit free insertion of either end 24 of a link 21 through either of the reversible blade portions 36 and 37. Thus, when a link 21 extends through either of the slots 42 and 43, such slots permit radially inwardly shifting of the blades relative to the bight portion 22 of the link to minimize transmission of impact or shock loads to the link, the pin, the lugs or the shaft, and to prevent the blades from binding on the bight portion when a pair of the blades are thrown sideways from a back-to-back relation on the bight portion 22, such as when the cutting portions encounter an obstacle. As illustrated in FIG. 2, the portion 36 of each blade 30 is engaged with the link 21 so as to function as a mounting portion, and the portion 37 functions as a cutting portion.

In order to provide for effective cutting, the longitudinal side edges 34 and 35 of each blade 30 are sharpened throughout their length to provide, in effect, four separate cutting edges indicated at 46 to 49, inclusive, in FIG. 3.

Each pair of blades 30 is mounted on a link 21 in the manner illustrated in FIGS. 1 and 2 with the mounting portions, in this instance the portions 36, arranged back-to-back. When the shaft 11 is rotating, the link 21 and blades 30 will swing outwardly and radially of the shaft 11 due to centrifugal force with the cutting portions, in this instance the portions 37, diverging from each other. Such force also causes the mounting portions 36 to diverge somewhat so that the blades of each pair engage each other along a line adjacent their transverse bend lines. Because the blade connecting means 13, 16, 21 provides a universal connection between the blades 30 and the shaft 11, the blades are free to swing should they strike a solid object.

With the foregoing construction, when the mower is in operation and the blades 30 are disposed in their positions illustrated in FIGS. 1 and 2, cuttings will be discharged from the cutting portions 37 of the blades due to the aforementioned angular relationship between the portions. However, some of the cuttings might extend into or through and be retained in the slots 43 of the cutting portions 37. Such accumulation might prevent or at least interfere with the discharge of subsequently cut material from the cutting edges. Cuttings might thus continue to accumulate on the cutting edges until a portion or all of the cutting edges were covered so that cutting efficiency would be lost.

According to the invention, the blade 30 includes means for preventing or substantially eliminating the accumulation of cuttings in the opening of its cutting portion. Such means, in the present instance, comprises a closure for the opening 43 in the cutting portion. Such closure preferably comprises a portion 50 of the material of the blade 30 which is severed therefrom but retained to close the opening 43. The portion 50 may be formed by any conventional forming technique, for example, by punching the portion 50 from the blade such that the portion 50 is severed from the blade but retained by the margin of the opening.

As will be apparent from FIGS. 2 and 4, the portion 50 is inclined with respect to the plane of the surrounding strip. Preferably, the outer end, indicated at 51, of the portion 50 is displaced relative to one of the opposed side faces of the blade 30. In this instance, it is displaced radially inward relative to the inner side face, indicated at 52, of the blade. The inner end, indicated at 53, of the portion 50 is flush with the side faces of the blade. Thus, at least a portion of the closure 50 is partially displaced radially inward from the plane of the blade or strip 30. The opening 43 is thus closed by the portion 50 so that no cuttings can accumulate therein. Moreover, since the outer end 51 of the portion 50 is displaced radially inward of the inner side face 52, there is no projection on which cuttings might tend to lodge.

In order to prevent accidental disengagement of the severed portion 50 from the opening 43, the portion 50 may be releasably secured in the opening 43 in addition to the restraint provided by the frictional engagement of the portion 50 with the margin of the opening. As shown in FIGS. 1, 3 and 4, such securement may be obtained by a staked or upset portion 56 of the material of the portion 50 and blade 30. Such staking is preferably done at the outer end 51 of the portion 50.

When the cutting edges 46 and 47 then in use become dulled, the blades of each pair could be turned side-for-side to bring a new pair of cutting edges 47 and 46 into cutting position. At such time, the portions 50 remain in place to prevent accumulation of cuttings in the openings 43.

After both of the cutting edges 46 and 47 of the cutting portion 37 have become dulled and it is desired to shift the blade end-for-end and bring one or the other of the cutting edges 48 or 49 into cutting position, the closure 50 may be readily removed from the opening 43 in the field in the manner of a conventional knockout plug. Thus, the opening 43 is available for the insertion of link 21 therein. Thereafter, the blade 30 may be used until the edges 48 and 49 become dulled, at which time the blade is removed for sharpening or replacement.

In FIGS. 5 to 7, inclusive, another blade construction 60 embodying the features of the present invention is illustrated. The blade construction 60 is substantially the same as the blade construction 30 and therefore like reference numerals have been used to identify identical parts. Each blade construction 60 thus includes reversible mounting and cutting portions 36 and 37, respectively, having openings or slots 42 and 43 therein, and a closure 50 for the opening 43, comprising the portion severed from the blade in forming the opening 43.

The blade construction 60 differs, however, from the blade construction 30 in that the closure 50 of the former is flush with the blade, that is, the closure 50 has its radially outer and inner faces 62 and 64, respectively, coplanar with the radially outer and inner faces 54 and 52 of the blade portion 37. With such an arrangement, not only is the opening 43 closed by the closure 50, but also the radially outer and inner faces 54 and 52 of the blade portion 37 are unobstructed by any projection of the closure 50. Consequently, cuttings cannot accumulate on the closure and possibly impair the cutting action of the blade edges 46 and 47.

The closure 50 of the blade construction 60 is preferably formed in the same manner as the closure 50 of the blade construction 30, that is, by punching or otherwise displacing the closure 50 toward one of the side faces 52 or 54 of the blade. The closure 50 is thus severed but retained by the margin of the opening 43. Thereafter, the closure 50 is pressed back into the opening 43 so that its opposed faces 62 and 64 are flush with those of the blade portion 37. In order to prevent accidental disengagement of the portion 50 from the opening 43 in the blade construction 60, the portion 50 may be releasably secured in the opening 43 in the same manner as in the blade construction 30, that is by staking as at 66. The blade construction 60 is, in all other respects, similar in construction and operation to the blade construction 30.

In FIGS. 8 to 10, inclusive, another blade construction 70 embodying the features of the invention is illustrated. The blade construction 70 is similar in many respects to the blade constructions 30 and 60 and therefore like reference numerals have been used to identify identical parts.

Each blade construction 70, in the present instance, comprises a blade 71 in the form of an elongated member or strip, preferably of metal, and identical in size and shape to the blade constructions 30 and 60. Thus, each blade 71 includes reversible mounting and cutting portions 36 and 37, respectively, the portions 36 and 37 being bent to define an obtuse angle therebetween, such obtuse angle being indicated at B in FIG. 8.

In order to permit engagement of each blade 71 with a link 21, the portions 36 and 37 are respectively provided with openings or slots 42 and 43 having the same configuration and location as the openings 42 and 43 of the previous embodiments.

When a pair of blades 71 is mounted on a link 21 in the manner illustrated in FIG. 8 with the portions 36 thereof functioning as mounting portions, the portions 37 will diverge from each other when the shaft is rotating due to centrifugal force. If the openings 43 were uncovered at this time, cuttings might extend into or through and be retained in the openings 43 in the cutting portions 37. Cuttings might thus accumulate on the cutting edges, indicated at 46 and 47, of the blades so that cutting efficiency would be impaired.

To prevent this, each blade construction 70 includes means for preventing or substantially eliminating the accumulation of cuttings in the opening or slot of its cutting portion. Such means, in the present instance, comprises a closure in the form of an elongated shield or strip 80 for the opening in the cutting portion. The shield 80 is preferably of metal, substantially thinner and somewhat narrower than the blade, and is bent on a line extending transversely of its length to provide two portions 86 and 87 having the same angular inclination to each other as the portions 36 and 37 of the blade 71 have to each other. Each shield 80 is adapted to lie against a face of a blade 71 in substantially surface-to-surface relation. In the present instance, the shield 80 lies against the radially inner face, indicated at 52, of the blade portion 37 and an associated outer face 88 of the blade portion 36. The shield is thus preferably positioned within the angle B of the blade 71.

In order to maintain the shield 80 in the aforementioned position with respect to the blade 71, the shield is preferably carried by the link 21 of the connecting means which supports the associated blade. To this end, the portion 86 of the shield 80 is provided with an opening therethrough in the form of an elongated slot 89 (FIGS. 8 and 9) of the same size of the slot 42 in the blade 71. Thus, when the shaft 11 rotates, centrifugal action causes the portion 87 of the shield 80 to overlie and close the openings 43 in the blade portion 37, thereby preventing cuttings from accumulating in the slots 43 and possible interference with the cutting action of the blades. Since the width of the shield 80 is less than that of the blade 71, interference with the cutting action of the sharpened edges 46 and 47 of the blade 71 is avoided.

Assume that a shield 80 has been mounted on each blade 71 of a pair of the blades, in the manner shown in FIG. 8. When the cutting edges, such as edges 46 and 47 of a pair of the blades 71, have become dulled or nicked and a new set of cutting edges 47, 46 is brought into cutting position by reversing the blades 71 side-for-side, the shields 80 will cover the openings 43 in the cutting portions 37 in the same manner as before. When these edges become dulled or nicked and the blades 71 are reversed end-for-end and remounted on the link 21 with the latter extending through the openings 43, the shields 80 will function to close the openings 42 which are then in the cutting portions of the blades.

I claim:

1. A blade for a mower having a rotatably driven horizontal shaft and connecting means for connecting the blade to the shaft, said blade comprising a strip having longitudinally spaced ends and openings therein adjacent the respective ends, one of said openings being adapted to receive said connecting means, and a closure for the other of said openings in said blade to prevent accumulation of cuttings in said other opening when the blade is in use, said closure being removable to permit end-for-end reversal of said blade and engagement of said connecting means in said other opening.

2. A mower blade construction according to claim 1, in which said strip is bent along a line extending transversely of its length intermediate its ends to provide two portions inclined to each other, each of said portions having one of said openings theren.

3. A mower blade construction according to claim 1, in which said closure comprises a severed but retained portion of the material of said blade.

4. A mower blade according to claim 3, in which the outer end of said severed portion is releasably secured to said blade to prevent accidental disengagement of the severed portion from said blade.

5. A mower blade according to claim 4, in which said outer end of said severed portion is releasably secured to said blade by staking.

6. A mower blade construction according to claim 3, in which a portion of said severed portion is displaced outwardly from one of the side faces of said strip.

7. A mower blade according to claim 3, in which said severed portion is inclined with respect to the plane of the surrounding strip with the outer end of the severed portion displaced radially inward from the plane of the strip and with the inner end of the severed portion flush with said blade.

8. A mower blade construction according to claim 3, in which said severed portion is disposed in said other opening and is flush with said blade.

9. A blade construction for a mower having a rotatably driven horizontal shaft and connecting means for connecting the blade to the shaft, said blade construction comprising a strip bent along a line extending transversely of its length to provide two portions inclined to each other, each of said portions having an opening therein, the opening in one of said portions being adapted to receive said connecting means, and a closure for the opening in the other of said portions to prevent accumulation of cuttings in said opening when the blade is in use, said closure comprising a severed but retained portion of the material of said blade and being removable to permit end-for-end reversal of said blade and engagement of said connecting means in said other opening.

10. A mower blade construction according to claim 9, in which the outer end of said severed portion is displaced radially inwardly of said blade.

11. A blade construction adapted for use with a mower having a rotatably driven horizontal shaft and connecting means for connecting the blade to the shaft, said blade construction comprising a strip having opposed side faces and longitudinally spaced ends, said strip also having openings therein adjacent the respective ends, one of said openings being adapted to receive said connecting means, and a shield adapted to be carried by said connecting means and to overlie the other of said openings therein to prevent accumulation of cuttings in said other opening when said blade is in use, said blade being reversible end-for-end to permit engagement of said connecting means in said other opening.

12. A mower blade construction according to claim 11, in which said blade is bent along a line extending transversely of its length to provide two portions inclined to each other, and said shield comprises an elongated plate member bent to overlie said blade in surface-to-surface relation.

13. A mower blade construction according to claim 12, in which said blade is sharpened along its longitudinal edges, and said shield is narrower than said blade to prevent interference with the cutting action of said sharpened edges.

14. A mower blade construction according to claim 12, in which said portions of said blade form an obtuse angle with each other, and said shield is positioned within said obtuse angle.

15. A blade construction according to claim 11, in which said shield has an opening adjacent one end thereof to receive said connecting means.

No references cited

ANTONIO F. GUIDA, *Primary Examiner.*